United States Patent
Kisatsky et al.

[15] 3,645,633
[45] Feb. 29, 1972

[54] CHROMACORDER

[72] Inventors: Paul J. Kisatsky, Mount Fern; Louis R. Szabo, Landing, both of N.J.

[73] Assignee: The United States of America as represented by the Secretary of the Army

[22] Filed: Jan. 11, 1971

[21] Appl. No.: 105,385

[52] U.S. Cl. ............................. 356/177, 356/176, 250/226, 209/111.5
[51] Int. Cl. ........................ G01j 3/46, G01j 3/48, G01j 3/50
[58] Field of Search .............. 356/173, 176, 177; 209/111.5, 209/111.6; 250/226

[56] References Cited

OTHER PUBLICATIONS

Schlotzer, Review of Sci. Instr. 36, (9) Sept. 1965, pp. 1350-2
Ward, J. W., Amer. Dyestuff Reprtr, 55, (23) Nov. 21, 1966, pp. 55–61
Vangorcum et al., Control, April, 1967, pp. 158–162 (part 1), May 1967 pp. 236–240 (part 2)
O' Donnell et al., IEEE Trans. on Broadcast & TV Receivers, 15, (2) pp. 171–6, July 1969.

Primary Examiner—Ronald L. Wibert
Attorney—Harry M. Saragovitz, Edward J. Kelly, Herbert Berl and Ernest F. Weinburger

[57] ABSTRACT

An instrument for the instantaneous measurement of the chromaticity of time variant spectral sources including a plurality of narrow band sensors or transducers that in combination encompass the visible spectrum. Each consists of an interference filter and a linear photovoltaic cell whose three output voltages have been "optimum multiplied" for the three tristimulus functions through a voltage divider network. The corresponding individual outputs of the sensors are added by a summing feedback amplifier to provide a voltage output proportional to the tristimulus values. These proportional outputs are then summed by a unity gain summing amplifier whose output in turn is applied to one input of a pair of ratio recorders. The other ratio recorder inputs each receive one of the proportional outputs. Each ratio recorder inputs each receive one of the proportional outputs. Each ratio recorder output, therefore, is one of the normalized chromaticity coordinates. The output coordinate values ($x$ and $y$) are simultaneously fed into a chart recorder to derive a plot of the chromaticity coordinates vs. time.

The invention described herein may be manufactured, used and licensed by or for the Government for governmental purposes without the payment to us of any royalty thereon.

10 Claims, 3 Drawing Figures

PATENTED FEB 29 1972

INVENTORS,
PAUL J. KISATSKY
LOUIS R. SZABO

of 3,645,633 …

CHROMACORDER

BACKGROUND OF THE INVENTION

The present invention relates to the measurement of the color of a light source and more particularly pertains to a novel system for instantaneously ascertaining and recording the chromaticity coordinates of light energy emanating from a source utilizing the concept of tristimulus values by providing computerized internal compensation.

DESCRIPTION OF THE PRIOR ART

In the field of color measurement, it has been the general practice to adapt and employ either the presently available scanning spectrophotometer system or specialized photocell-filter combinations to determine the tristimulus values of a time varying source. Such devices have proved unsatisfactory in that the scanning spectrophotometer system operates on the principle of dispersing the light into its spectral components and then computing therefrom the tristimulus values by a defined computation technique. In view of the fact that this instrument must scan the entire spectrum, a process which can require a period of minutes, it is, therefore, incapable of measuring a time variant or flickering light source. Although a maximum accuracy is attainable, the instrument is highly complex, requires a trained operator and requires time consuming, extensive, computations to obtain the desired color data.

The photocell-filter-type instrument utilizes a different concept which enables it to measure color on an instantaneous basis. However, the resultant accuracy is substantially degraded by a phenomena known as metamerism. The light from the source passes through a colored glass filter having a certain spectral transmittance function before impinging on a photocell. The cell output is continuously recorded employing a separate photocell-filter combination for each of the three tristimulus values. In order for the cell output to represent the tristimulus value, the spectral response of the combination must closely match a CIE predefined function. It has been impossible, to date, to fabricate a glass color filter to provide a specifically defined spectral transmittance function or characteristic. This inherent difficulty permits the instrument to only approximate the desired tristimulus values. Additionally, metameric error can be introduced. This term refers to the fact that a color (as seen by the human eye) can be synthesized by an infinite number of spectral distributions. Thus for a given spectral distribution the instrument may read correctly, but when the same color, with a different spectral distribution is to be measured, the instrument will read incorrectly. Clearly, an infinite number of tristimulus values, both correct and incorrect, can be obtained for the same color with different spectral distributions. Although metameric deceit can be eliminated by having the spectral response of the cell-filter accurately correspond to the CIE function, it has thus far, proved to be an impossible task with respect to colored glass filters. The present invention overcomes these deficiencies and fills a needed void especially, for light sources such as flares.

SUMMARY OF THE INVENTION

The general purpose of the invention is to provide an instrument for the instantaneous, accurate measurement of the color of a time varying source, that has all the advantages of similarly employed prior art devices and none of the above described advantages. To attain this, the present invention provides a unique system wherein a plurality of combined narrow band interference filters and photovoltaic cells are arranged and directed toward an unknown light source. The output of each of these linear cells is connected across a three branch selective divider network whose three picked-off outputs are proportional to the three tristimulus standard values for that particular narrow band. The corresponding outputs are thereafter summed by three individual feedback amplifiers whose outputs, in turn, are summed and applied to one input of each of two ratio recorders. The other inputs of the ratio recorders each receive the output of one of the feedback amplifiers. Thus the outputs of the ratio recorders are in normalized form and by application to an X-Y recorder a plot of two of the chromaticity values vs. time is obtained.

An object of the present invention is to provide a device for the instantaneous measurement and recordation of the color chromaticity of a time variant light source.

Another object is to provide a highly stable instrument capable of instantly, accurately, reliably, rapidly and inexpensively measuring in the international chromaticity coordinate system, the color composition of a time varying source without the necessary intervention of a skilled technician or complex, time consuming computations.

Still another object is to provide an instrument for measuring the chromaticity of a varying intensity source whose operation is simple and direct, stable and with relatively few necessary adjustments and whose measurement is independent of light intensity.

Other objects and many of the attendant advantages of this invention will be readily appreciated as the same becomes better understood by reference to the following detailed description when considered in connection with the accompanying drawings.

DESCRIPTION OF A PREFERRED EMBODIMENT

Figure 1:
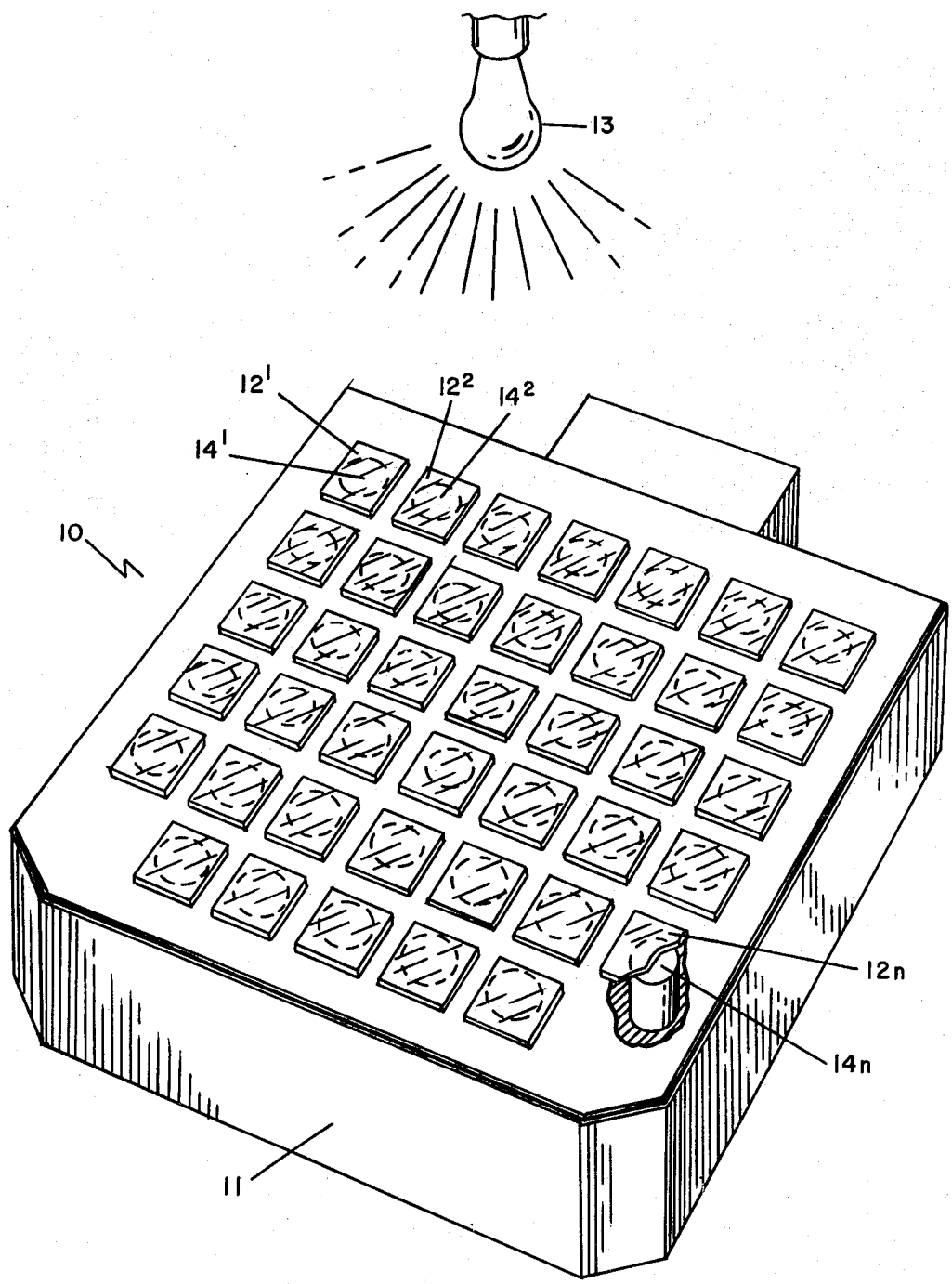
FIG. 1 is a perspective view of a photometer optical head made in accordance with the instant invention.

In the embodiment of FIG. 1, the photometer head 10 includes a honeycomblike structural holder 11 which carries and supports a plurality of optical interference filters 12, arranged in close proximity so that the overall size of the structural is minimized, and each filter is approximately the same distance from the light source 13 whose chromaticity is to be measured. The filters 12 are individually selected so that each transmits therethrough only a restricted narrow band of the visible spectrum, but with a relatively high-transmission factor for maximum sensitivity. The sum total transmission of all the filters is such that they cover the entire visible spectrum from approximately 400 to 700 microns without excessive optical gaps or overlap within the spectrum. Although uniform distribution is not critical, it is desirable to achieve the best possible match while, at the same time, it is necessary to accurately know the transmission function of each filter in order to optimize this parameter in the final chromaticity values. Disposed behind each filter and directed outwardly in a photovoltaic cell 14 which senses the light transmitted through its associated filter and converts this passed light into a linearly proportional electrical current output, thus, performing the function of a transducer. The total number of filters and cells is not critical and can be varied but, with an attendant loss of sensitivity and accuracy. Too many units increase the overall size of the holder while too few reduce the total signal detected. Satisfactory results have been achieved through the employment of approximately 40 units.

Figure 2:
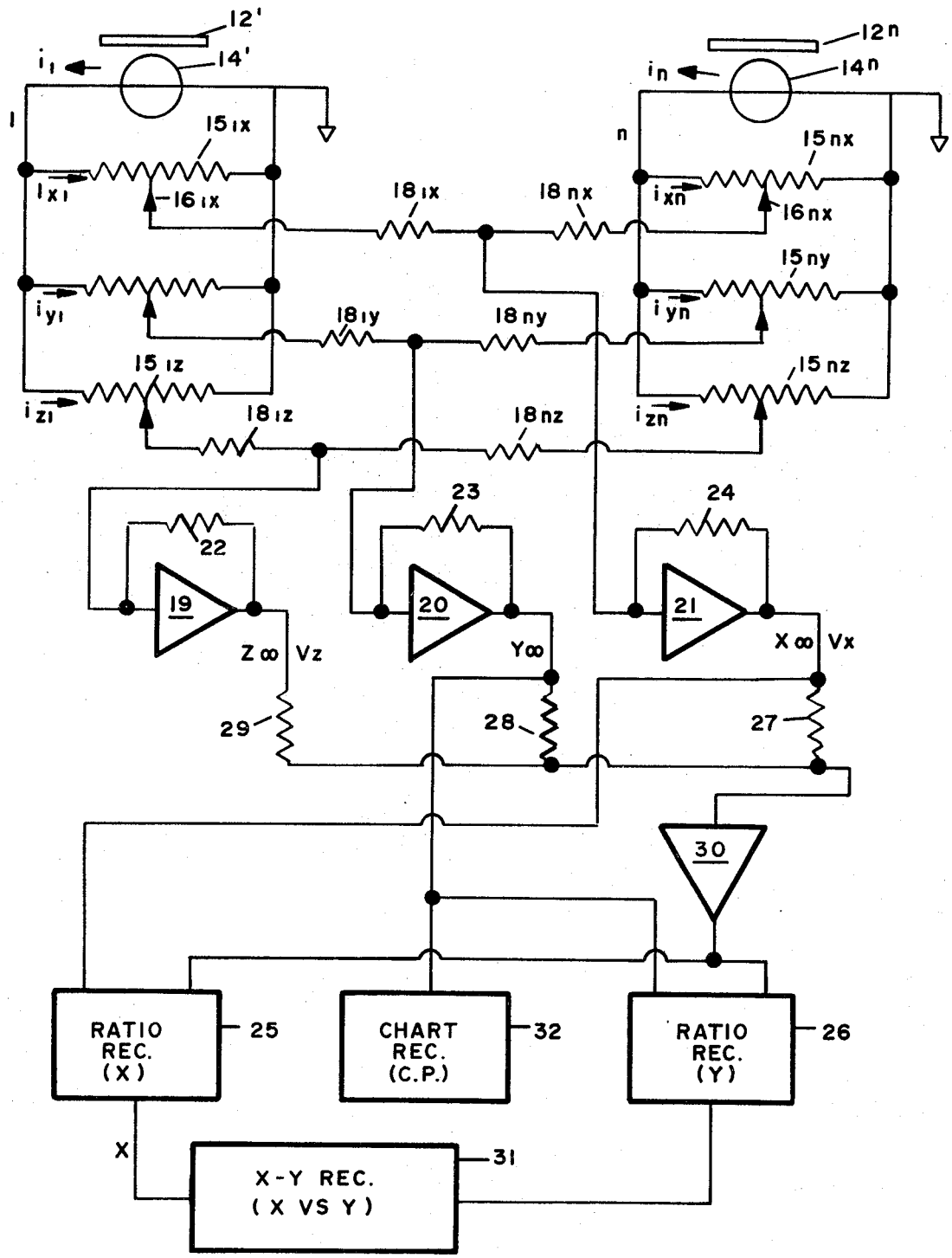
FIG. 2 is a schematic diagram partially in block form of an embodiment made in accordance with the principles of the instant invention; and, FIG. 3 is a graphical representation of the tristimulus functions in terms of relative magnitude vs. wavelength.
Figure 3:
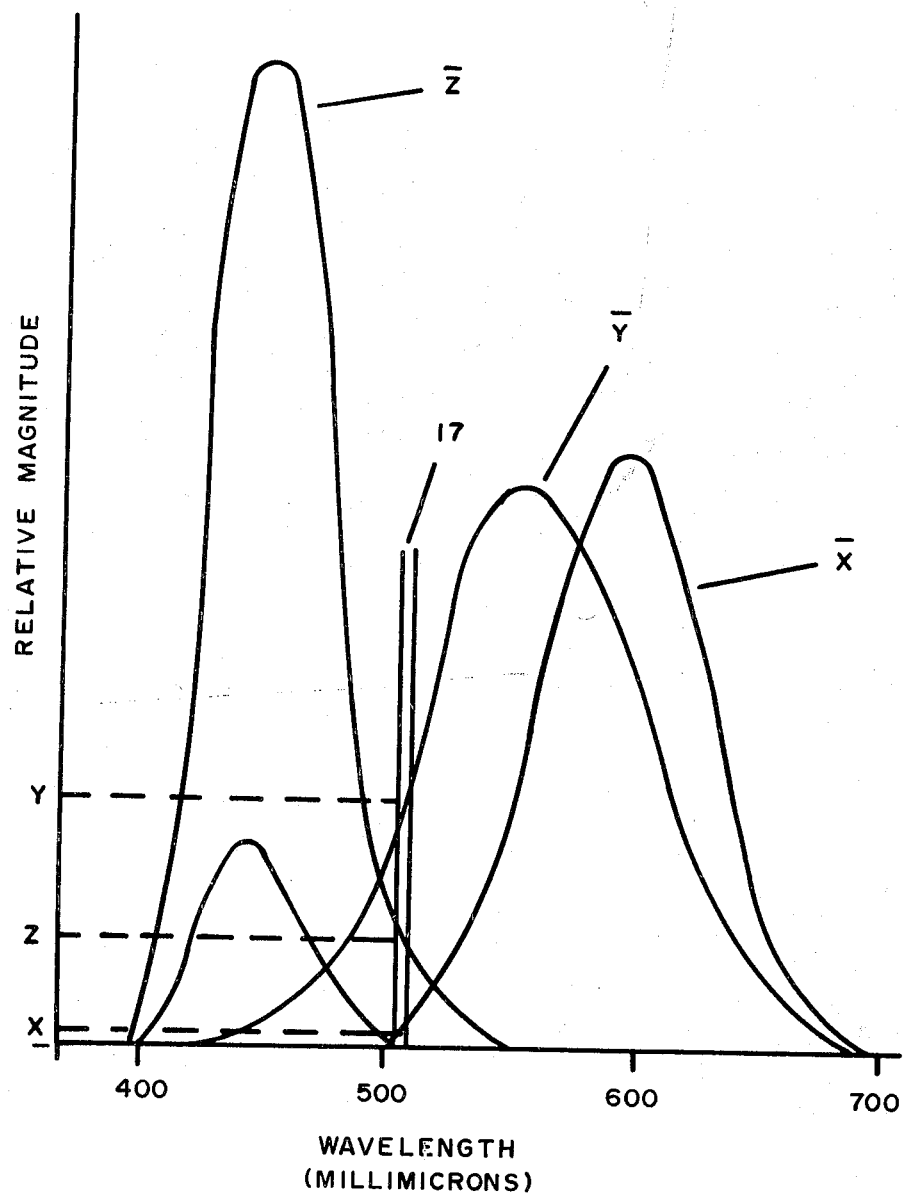

Referring now to FIG. 2, each of the filter-cell units have been shown to designate a separate channel. Each cell is connected in parallel with the resistive elements of three separate potentiometers 15' (which may, where desired, consist of two separate resistors). Each potentiometer forms a divider network across the photovoltaic cell and, where the total resistance of each potentiometer is equal then, the cell current output $i$, is divided into three equal arm currents $i_x$, $i_y$ and $i_z$. The setting or position of the potentiometer arm 16 is adjusted so that the voltage outputs of the specific channel converter include therein "optimum" multipliers (calculation discussed hereinafter). These multipliers include (although are not limited and) the tristimulous factor, photovoltaic cell efficiency, and the interference filter transmission factor, etc. As an example, consider the narrow band filter which transmits the band 17 slight above 500 microns as shown in FIG. 3. The relative multiplier factors for the three tristimulus functions of this band are indicated along the relative magnitude axis. If the relative numerical value of the combined multiplier for the x component of channel $n$ is 0.075 then resistance across which the output is tapped (right side of potentiometer) will be 0.075 of the total potentiometer resistance. The output voltage $v_{xn}$ is then 0.075 $v_{tn}$ (total voltage across pot). Each of the $v_{xn}$ output signals are applied through high input resistors 18 to summing feedback amplifier 19. Similarly, the $v_{yn}$ and $v_{zn}$ outputs are applied through their respective input resistors to summing amplifiers 20 and 21. These high-valued input resistors serve to isolate the amplifier from the cell current and prevent overloading of the divider networks. Since all the input resistors are identical, they provide an input resistance $R_{in}$ to each amplifier which is also provided with a feedback resistors 22, 23, and 24 whose resistance is $R_{FB}$. Therefore, the summing amplifier outputs are $$V_x = \frac{R_{FBX}}{R_{in}} \sum_{n=1}^{n} v_{xn}$$

$$V_y = \frac{R_{FBy}}{R_{in}} \sum_{n=1}^{n} v_{yn}$$

$$V_z = \frac{R_{FBZ}}{R_{in}} \sum_{n=1}^{n} v_{zn}$$

where $v_{xn}$, $v_{yn}$ and $v_{zn}$ are the channel voltage output signals.

Since the cell output signals have been "optimized" at the divider networks, then, ordinarily the summed output signals are proportional to the tristimulus values $x$, $Y$, and $Z$.

$$x = K_x V_x$$
$$y = K_y V_y$$
$$Z = K_z V_z$$

By experimental measurements using a National Bureau of Standards certified source having known tristimulus values, the proportional factors $K$ can be readily ascertained. They are introduced into the system by selecting appropriate feedback resistor magnitudes such that the summed outputs numerically correspond to their respective tristimulus values.

The tristimulus values $X$, $Y$, and $Z$ fully define the color of a source however, their magnitude varies in accordance with the source intensity. For example, a source with M candlepower would have tristimulus values $X_1$, $Y_1$, and $Z_1$, while another similar source twice as bright (2M candlepower) will have tristimulous values of $2X_1$, $2Y_1$, and $2Z_1$. Since the relative color of a source is to be measured, the system is normalized so that any given color is designated with the same number but independent of the source intensity. The form of designation is referred to as the chromaticity coordinate system. The coordinates $(x, y$ and $z)$ are defined as:

$$x = \frac{X}{X+Y+Z}$$

$$y = \frac{Y}{X+Y+Z}$$

$$z = \frac{Z}{X+Y+Z}$$

Since from the above equations:
$x+y+z=1$, any two of the coordinates would fully define the source color. The conventionally accepted coordinates $x$ and $y$ have been chosen for application in this embodiment.

The normalization is accomplished through the use of a pair of ratio recorders 25 and 26 whose one input each, receives the tristimulus values $X$ and $Y$. The other input thereto is derived by applying the tristimulus values from the summing amplifiers 19, 20 and 21 through input resistors 27, 28 and 29 to a unity gain summing amplifier 30. These ratio recorders are analog instruments which effectively compute, record and provide a signal output which is a ratio of the voltage input signals. The output signals from the ratio recorders; namely, the chromaticity coordinates $x$ and $y$ are fed into an $x$–$y$ recorder 31 where these values are plotted on orthogonal axes against time as is performed by a standard strip type recorder with two variables. The resultant data provides valuable information on the behavior of the color variation of a source, such as a burning flare. In addition, the chromaticity values can be recorded directly on to a CIE chromaticity chart whereby the color recognition is immediate. Since by definition, the $Y$ tristimulus value indicates the source candlepower, its recording by chart recorder 32 supplies this additional data.

The CIE Chromaticity System is based on the fact that any arbitrary color can be produced by the mixture of appropriate amounts of three well defined primary colors. These primary colors known as Tristimulus Values are defined by the National Bureau of Standards and are designated by $X$, $Y$ and $Z$.

By specifying the entire range of monochromatic colors in the amounts of $X$, $Y$ and $Z$ necessary to produce them at each wavelength, three well-known functions $x(\lambda)$, $y(\lambda)$ and $z(\lambda)$ are defined.

Since an arbitrary color is a superposition of an infinite number of spectral colors and since each spectral color in turn is defined fined in terms of three primary colors, it is possible to specify the tristimulus values of that arbitrary color. We would do this in the following manner: The amount of $X$ in the sample is found by determining the amount of $X$ in each wavelength band, weighted by relative amount of that band in the sample, and then added up for all bands. $Y$ and $Z$ are determined in exactly the same manner. This information is expressed in the following mathematical definition of the tristimulus values:

$$X = \int_0^\infty f(\lambda) \bar{x}(\lambda) d\lambda$$

$$Y = \int_0^\infty f(\lambda) \bar{y}(\lambda) d\lambda$$

$$Z = \int_0^\infty f(\lambda) \bar{z}(\lambda) d\lambda$$

where $f(\lambda)$ is the spectral function of an arbitrary color.

It can be seen that a close match to tristimulus functions $\bar{x}$, $\bar{y}$ and $\bar{z}$ yields a highly accurate continuous color measurement.

The embodiment of this invention is provided with three main channels $CH_X$, $CH_Y$ and $CH_Z$ representing $\bar{x}$, $\bar{y}$ and $\bar{z}$ respectively. Each of these channels has 40 subchannels, which represent photocell signals modified by optimum" multipliers in order to obtain a close match to $\bar{x}$, $\bar{y}$ and $\bar{z}$.

A mathematical analysis for these optimum multipliers results in a set of linear simultaneous equations, which are shown below for channel $CH_X$. (Equations for channels $CH_Y$ and $CH_Z$ are similar.)

$$\sum_{\substack{n=1 \\ m=1}}^{40} a_{x_n} A_{nm} = C_{x_m}$$

where $$A_{nm} = \int_0^\infty g_n(\lambda) g_m(\lambda) d\lambda$$

$$C_{xm} = \int_0^\infty \bar{x}(\lambda) g_m(\lambda) d\lambda$$

$a_n$ = optimum multipliers $g_m$ & $g_n$ = interference filter transmission curves A computer is used to solve the foregoing simultaneous equations for optimum multipliers $a_{x_n}$, $a_{y_n}$ and $a_{z_n}$.

Applying these multipliers will result in the close approach of $$\sum_{n=1}^{40} a_{x_n} g_n = \bar{x}$$

$$\sum_{n=1}^{40} a_{y_n} g_n = \bar{y}$$

$$\sum_{n=1}^{40} a_{z_n} g_n = \bar{z}$$

for channels $CH_X$, $CH_Y$ and $CH_Z$ respectively.

Furthermore, if the photovoltaic cells were uniformly sensitive through the visible spectrum the three main channels would yield the true tristimulus values $X$, $Y$ and $Z$. However, the photocells are not uniformly sensitive, therefore, another set of 40 multipliers are computed to compensate for that and they are obtained experimentally by employing known sources.

This accomplish by using a National Bureau of Standard certified standard spectral output to compare each cell at its particular frequency band for sensitivity. From this information, the experimental multipliers are determined so that when applied, a uniformity is achieved across the spectrum. In other words, equal light energy will result in equal voltage signals across the visible spectrum.

It should be understood, of course, that the foregoing disclosure relates to only a preferred embodiment of the invention and that numerous modifications or alterations may be made therein without departing from the spirit and the scope of the invention as set forth in the appended claims.

We wish to be understood that we do not desire to be limited to the exact detail of construction shown and described for obvious modification will occur to a person s killed in the art.

We claim:

1. A device for measuring the instantaneous chromaticity values of a light sources which comprises:

a plurality of filtered photodetectors each sensitive to a different narrow band of the visible spectrum and in combination sensitive to substantially the entire visible spectrum, for generating electrical signals proportional to visible light from said source impinging on them, circuit means connected to the output of each of said photodetectors to divide the signals among three current paths each of said paths receiving signals from each photodetector, and including further circuit means in each path to modify the voltage magnitude of the signal inputs to said circuit means to be proportional to a tristimulus value function of said source for said plurality of narrow bonds, three summing feedback amplifiers having feedback resistors and each having connected to its input one of said outputs of said three current paths, summing means having its input connected to receive the output of each of said summing feedback amplifiers for normalizing the tristimulus value signals, a pair of ratio forming means for forming chromaticity coordinates of said impinging light each having two inputs and providing an output wherein the output voltage is proportional to the ratio of the input voltages, one input of each of said ratio means connected to receive the output of said summing means, the other input of one of said ratio means connected to receive the output of one of said summing amplifiers, the other input of the other of said ratio means connected to receive the output of another of said summing amplifiers, an orthogonal time display means having a pair of inputs each connected to receive the output of one of said ratio means, and for indicating the instantaneous plot of the chromaticity coordinates vs. time of said light source.

2. The device according to claim 1 wherein each of said transducer means includes a photovoltaic cell and a narrow band interference optical filter disposed proximate and intermediate of said cell and said source.

3. The device according to claim 2 wherein said further circuit includes three resistive elements all connected in parallel across said cell and each having a variable output tap across a portion thereof.

4. The device according to claim 3 wherein said resistive elements are potentiometers and the tap thereof may be selectively adjusted for compensation.

5. The device according to claim 4 further including a high-resistive element disposed intermediate each of the outputs of said transducer means and said summing feedback amplifiers.

6. The device according to claim 5 wherein said summing means is a unity gain amplifier.

7. The device according to claim 6 wherein said ratio means are ratio recorders and said time display means is an $x-y$ recorder.

8. The device according to claim 7 further including a chart recorder connected to receive the output of one of said summing amplifiers.

9. A method for determining the instantaneous chromaticity values of a light source which comprises the steps of:

a. detecting simultaneously in a plurality of narrow optical spectral bands spaced across the visible spectrum the light emitted bit said source, b. generating a plurality of electric signal proportional to the light energy in said narrow detected bands, c. converting each of said plurality of proportional signals into currents in three current paths corresponding to three tristimulus values, d. modifying electrically each of said proportional signals in accordance with standard tristimulus value functions for each detected band and the conversion efficiency of said conversion, e. summing each of the three modified current signals to obtain instantaneous tristimulus values of the detected light, f. resumming said three modified current signals to obtain the sum of said tristimulus values, g. comparing the ratio of said resummed current signals separately to at least each of two of said summed modified signals to determine at least two chromaticity coordinates of said detected light, simultaneously recording and displaying the ratio compared outputs on orthogonal axes vs. time.

10. The method of claim 9 further including the step of:

chart recording one of said modified summed signals to provide an indication of the source intensity.

* * * * *